United States Patent
Chu et al.

(10) Patent No.: US 8,284,927 B1
(45) Date of Patent: Oct. 9, 2012

(54) TELEPHONE USING AN EXTERNAL MEDIA DEVICE TO PROVIDE ON-HOLD INFORMATION

(75) Inventors: Christopher Chu, Lakewood, CO (US); Brijen Doshi, Thornton, CO (US); Paul Roller Michaelis, Louisville, CO (US); D. Michael Overmyer, Golden, CO (US); Chandra Ravipati, Thornton, CO (US); Michael J. Thomas, Denver, CO (US); Patrick Toole, Boulder, CO (US); Dongliang Wang, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 1413 days.

(21) Appl. No.: 11/861,660

(22) Filed: Sep. 26, 2007

(51) Int. Cl.
    *H04M 1/80* (2006.01)
    *H04M 3/428* (2006.01)
(52) U.S. Cl. .............. 379/393; 379/162; 379/201.01; 455/414.1; 455/550.1
(58) Field of Classification Search .............. 379/68, 379/266.01, 383, 162, 308, 201.01, 393; 455/414.4, 414.1, 550.1
    See application file for complete search history.

(56) References Cited

U.S. PATENT DOCUMENTS

| | | | | |
|---|---|---|---|---|
| 5,991,398 A * | 11/1999 | Lipton et al. | | 379/383 |
| 6,091,812 A * | 7/2000 | Iglehart et al. | | 379/308 |
| 6,122,346 A * | 9/2000 | Grossman | | 379/68 |
| 2003/0235289 A1* | 12/2003 | Gutta et al. | | 379/266.01 |
| 2004/0176079 A1* | 9/2004 | Fratti | | 455/414.1 |
| 2007/0004384 A1* | 1/2007 | Anupam | | 455/414.1 |
| 2007/0041357 A1* | 2/2007 | Hoffmann et al. | | 370/352 |
| 2007/0223666 A1* | 9/2007 | Teague | | 379/162 |

OTHER PUBLICATIONS

U.S. Appl. No. 11/321,305, filed Dec. 29, 2005.

* cited by examiner

*Primary Examiner* — Harry Hong

(57) ABSTRACT

A telephone is provided with a port for disconnectably connecting an external information source, such as an MP3 player, to the telephone, and an on-hold function that operates while a call of the telephone is on hold and either presents to the telephone's user the information from the external source if the external source is connected, or presents to the user on-hold information from a telephone network if the external source is not connected, or presents silence at the user's option, irrespective of whether or not the external source is connected.

20 Claims, 3 Drawing Sheets

TELEPHONE USING AN EXTERNAL MEDIA DEVICE TO PROVIDE ON-HOLD INFORMATION

TECHNICAL FIELD

This invention relates to telephones.

BACKGROUND OF THE INVENTION

Telephone users desire to customize the information (e.g., music) that they receive while they are on hold. To permit such customization, U.S. patent application Ser. No. 11/321, 305, filed on Dec. 29, 2005, discloses that a telephone may receive from a telephone switch customized on-hold information uploaded by the user, or that the telephone may have an internal source of on-hold information, or that the telephone may have a mechanism for playing on-hold information received via radio-frequency waves, the Internet, or even another telephone.

Some telephones have a docking station for connecting a portable device, such as a personal hand-held assistant (PHA), to the telephone for purposes of synchronizing data contents of the telephone and the portable device. For example, the Mitel 5230 IP phone offers a docking station for synchronizing a Compaq iPAQ device with the phone, thereby allowing association of contact data, etc., stored in the iPAQ device with the phone. It also offers the users the ability to access Windows-CE operating system-based desktop applications such as portable voice mail and dial by address book.

SUMMARY OF THE INVENTION

This invention achieves an advance over the prior art by providing a telephone with a port for disconnectably connecting an external information source, such as an MP3 player, for example, to the telephone, and, further providing the telephone with on-hold functionality that operates while a call of the telephone is on hold and either presents to a user of the telephone the information from the external source if the external source is connected to the port, or presents to the user information from another source, such as a telephone network, for example, if no external source is connected to the port. Advantageously, the on-hold functionality may be further adapted to present no information to the user, at the user's option and irrespective of whether the external source is or is not connected to the port. Illustratively, the telephone signals the telephone network whether or not to send on-hold information to the telephone, for example, via SIP "200 OK" messages. The user is thus given wide latitude in selecting on-hold information, including silence.

The external device may also display the on-hold status to the user, and signal the user when they are taken off of hold.

While the invention has been characterized as apparatus, it also includes method that corresponds to the functionality of the apparatus.

BRIEF DESCRIPTION OF THE DRAWING

These and other features and advantages of the invention will become more apparent from considering the following description of an illustrative embodiment of the invention together with the drawing, in which.

DETAILED DESCRIPTION

Figure 1:
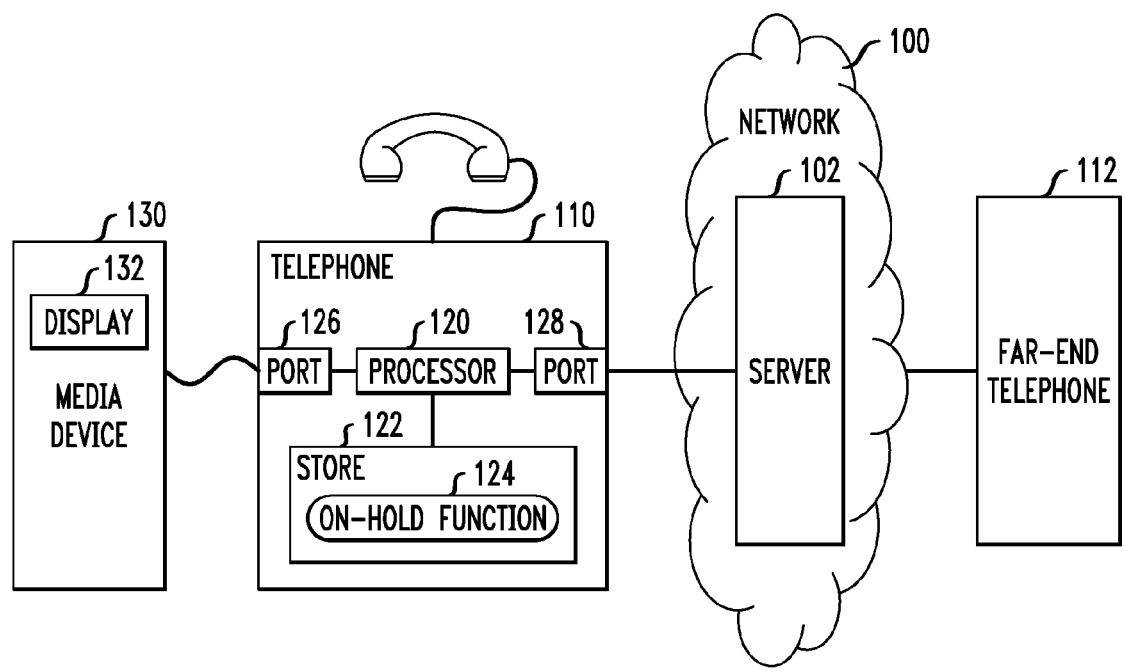
FIG. 1 is a block diagram of a communications system that includes an illustrative embodiment of the invention.

FIG. 1 shows an illustrative telephone communications system comprising a plurality of telephones 110, 112 interconnected by a network 100 that includes a serer 102. Telephones 110, 112 are illustratively voice over internet protocol (VoIP) user communications devices, and network 100 is illustratively the Internet or another wide area network, or an intranet such as a local area network, wherein server 102 is an Avaya Communications Manager, a VoIP PBX, a media server, or a proxy server. Alternatively, telephones 110, 112 may be conventional telephones and network 100 may be a conventional public or private telephone network, wherein server 102 is a central office switch or a private branch exchange. The system 100 as described so far is, for example, the communications system that is shown and described in U.S. patent application Ser. No. 11/321,305, filed on Dec. 29, 2005, which is hereby incorporated herein by reference in its entirety.

At least one telephone 110 is a stored-program-controlled device comprising a store 122 for storing the control programs and data and a processor 120 for executing the programs and generating and/or using the data. The programs in store 122 include an on-hold function 124. Telephone 110 further includes a port 126 for connecting external devices, such as a media device 130, to telephone 110, and a port 128 for connecting telephone 110 to network 100. Port 126 may be any desired port, either wired or wireless, but it illustratively a universal serial bus (USB) port. The external devices may be any desired devices, but for purposes of this application, media device 130 is a source of on-hold information, such as music, that is presented to a user of telephone 110 while their call is on hold. Media device 130 is illustratively a radio, a television set, a DVD player, or an MP3 player, such as an iPod of Apple Corp. Media device 130 optionally includes a display 132.

Figure 3A:
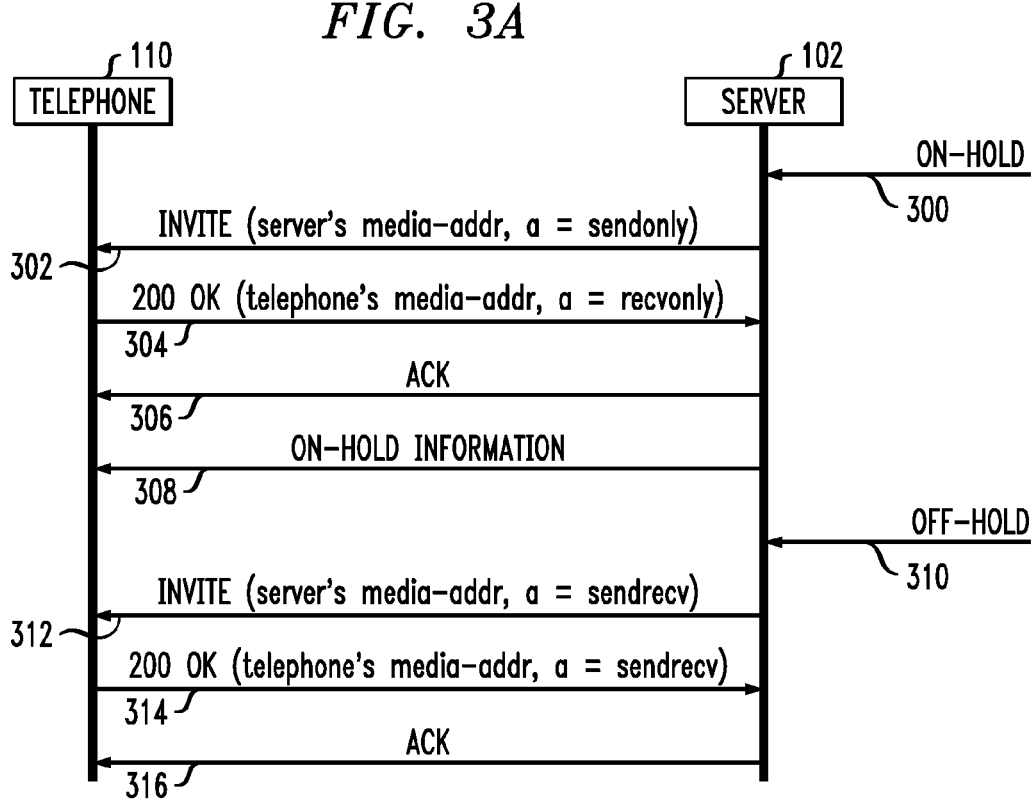
FIG. 3A is a signaling diagram of a first embodiment of hold signaling in the system of FIG. 1.
Figure 3B:
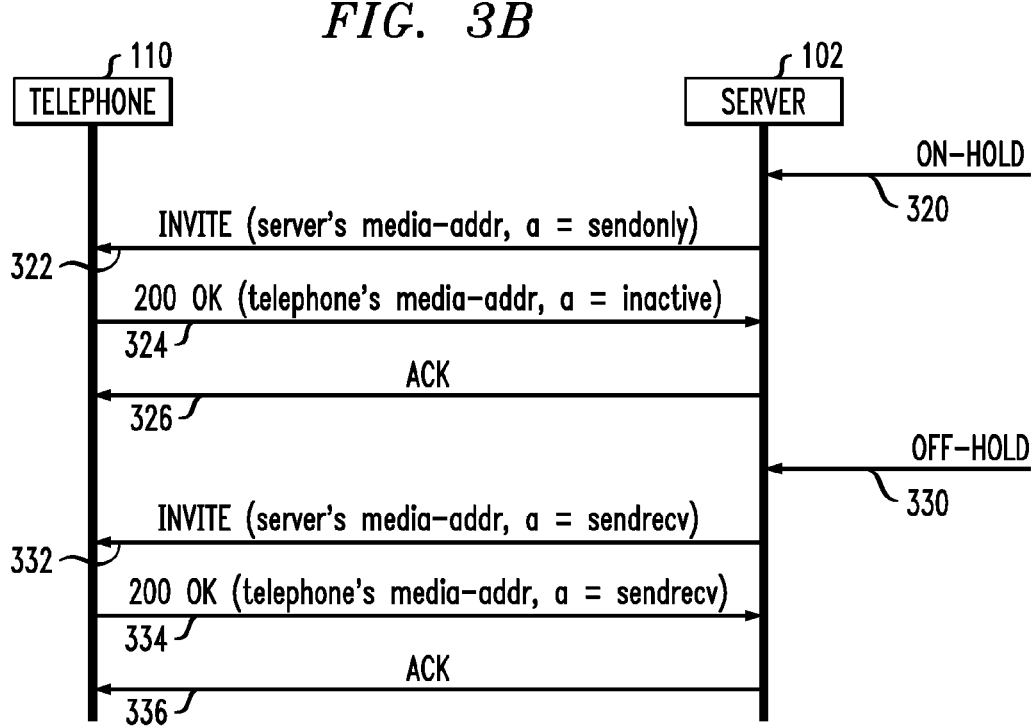
FIG. 3B is a signaling diagram of a second embodiment of hold signaling in the system of FIG. 1.

While engaged in a call with another telephone 112, telephone 110 may be put on hold and later may be taken off of hold, as is known in the art. Illustratively, telephone 110 operates under the session initiation protocol (SIP), wherein illustrative hold signaling is shown in FIGS. 3A and 3B. FIG. 3A shows SIP hold signaling for the case where telephone 110 presents on-hold information provided by sever 102, while FIG. 3B shows SIP hold signaling for the case where telephone 110 presents on-hold information provided by media device 130 or presents silence on hold.

When telephone 112 puts a call with phone 110 on hold, at step 300 of FIG. 3A, server 102 detects this condition and sends an "INVITE" message to telephone 110, at step 302. The "INVITE" message contains a media address of server 102 and a "sendonly" indication. This "sendonly" indication tells telephone 110 to stop sending media to server 102 and to only receive media from server 102. Telephone 110 responds by sending a "200 OK" message to server 102, at step 304. The "200 OK" message contains a media address of telephone 110 and a "recvonly" indication. The "recvonly" indication tells server 102 that telephone 110 is only receiving information from server 102, but is not transmitting any information to server 102. Server 102 replies with an "ACK" message, at step 306, and then sends on-hold information to telephone 110, at step 308. When telephone 112 takes the call off of hold, at step 310, server detects this condition and sends a "INVITE" message to telephone 110, at step 312 The "INVITE" message contains the media address of server 102 and a "sendrecv" indication. The "sendrecv" indication tells telephone 110 to resume sending and receiving media. Telephone 110 responds by sending a "200 OK" message to server 102, at step 314. This message contains the media address of telephone 110 and a "sendrecv" indication. Server 102 replies with an "ACK" message, at step 316.

The initial steps 320-324 of FIG. 3B are the same as the intial steps 300-304. But, in FIG. 3B, the "200 OK" message contains an "inactive" indication instead of the "recvonly" indication. The "inactive" indication tells server 102 that telephone 110 refuses to receive information from server 102. Server 102 replies with the "ACK" message, at step 326, but this time refrains from sending on-hold information to telephone 110. Instead, telephone 110 plays locally-obtained on-hold information on to its user. The remaining steps 330-336 of FIG. 3B are the same as steps 310-316 of FIG. 3A.

Figure 2:
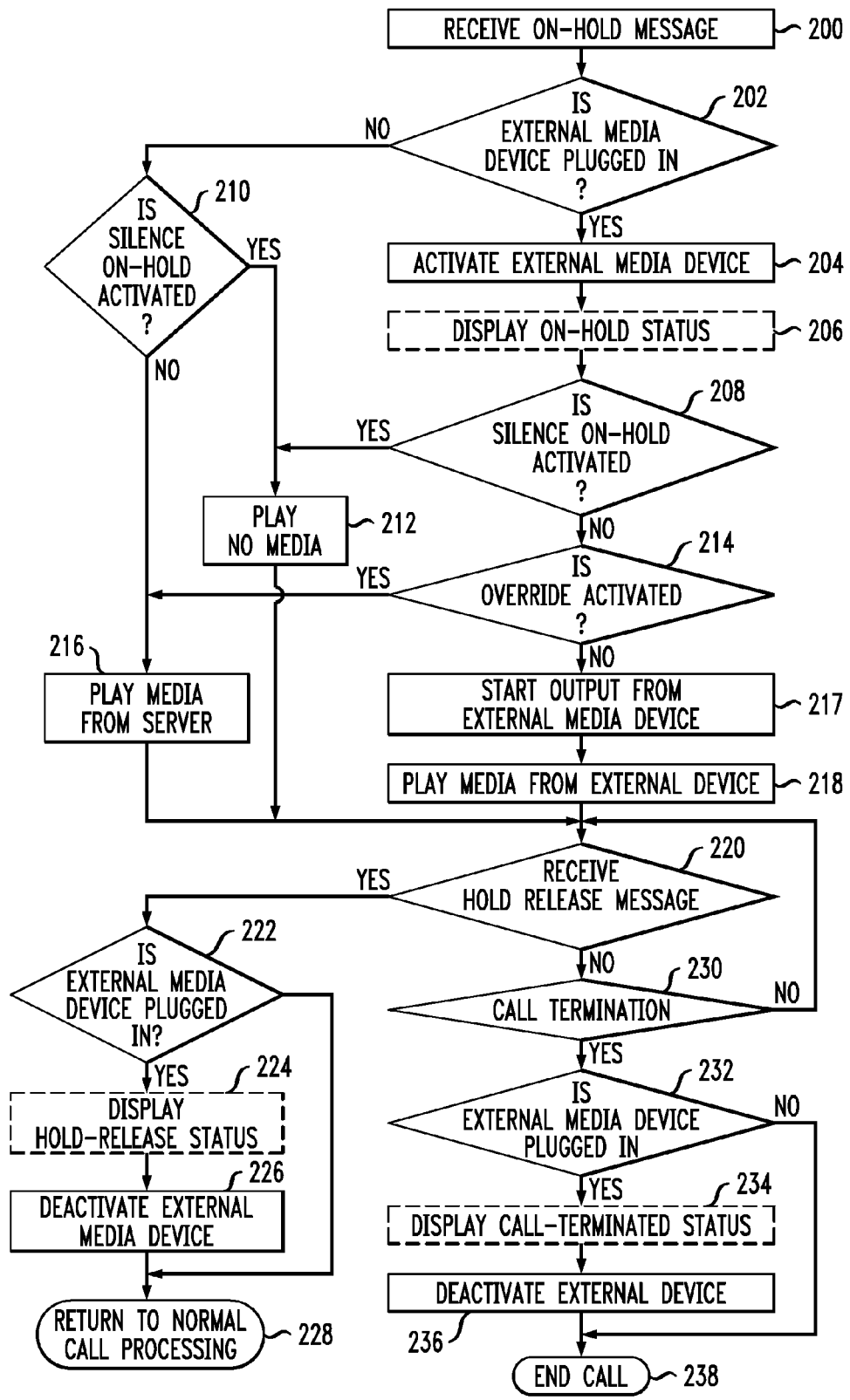
FIG. 2 is a functional flow diagram of an on-hold function of a telephone of the system of FIG. 1.

FIG. 2 shows the functionality of on-hold function 124 of telephone 110. Function 124 is executed when telephone 110 receives an on-hold message from server 102, at step 200. In the case of the SIP protocol signaling, the "on-hold" message is the "INVITE" message received at steps 302 and 322 of FIGS. 3A and 3B. In response, telephone 110 checks whether a media device 130 is connected to its port 126, at step 203. If media device 130 is not connected, telephone 110 checks whether silence on hold is activated, at step 210. This is illustratively a user-administered item. If silence on hold is activated, telephone 110 follows the signaling of FIG. 3A and plays no information to its user while the call is on hold, at step 212. Alternatively, user of telephone 110 may select some other activity while their call is on hold. If silence on hold is not activated, telephone 110 follows the signaling of FIG. 3A and presents to its user the on-hold information that it receives from server 102, at step 216.

Returning to step 202, if it is determined there that media device 130 is connected, telephone 110 activates media device 130 via signaling on port 126, at step 204, and optionally causes device 130 to display the on-hold status on display 132, at step 206. Telephone 110 then checks whether silence on hold is activated, at step 208. If so, telephone 110 follows the signaling of FIG. 3A and plays no information to its user while the call is on hold, at step 212. If silence on hold is not activated, telephone 110 checks its administrative data to determine whether playing of on-hold-information from an external device has been overridden, at step 214. If so, telephone 110 follows the signaling of FIG. 3A and presents to its user the on-hold information that it receives from server 102, at step 216. If playing of on-hold information from an external device has not been overridden, telephone 110 signals media device 130 to start outputting media to telephone 110, at step 217. This signaling may include a selection signal selecting particular information for playback from device 130. Telephone 110 then presents the information that it receives from device 130 to its user, at step 218.

Following step 212, 216, or 218, telephone 110 awaits receipt of a new message from server 102, such as a hold-release message. In the case of the SIP signaling of FIGS. 3A and 3B, the "hold release" message is the "INVITE" message received at steps 312 or 332 of FIG. 3A or 3B. If and when it receives a "hold release" message, as determined at step 220, telephone 110 checks whether an external media device 130 is connected to port 126, at step 222. If so, telephone 110 optionally causes device 130 to display the hold-release status, at step 224, and then deactivates device 130, at step 226.

Following step 226, or if it determines at step 222 that a device 130 is not connected to port 126, telephone 110 returns to normal call processing, at step 228.

If telephone 112 hangs up the call with telephone 110 instead of taking it off of hold, server 102 sends a conventional call-termination message to telephone 110. If and when it receives the call-termination message, as determined at step 230, telephone 110 checks whether an external media device 130 is connected to port 126, at step 232. If so, telephone 110 optionally causes device 130 to display the call-termination status, at step 234, and then deactivates device 130, at step 236. Following step 236, or if it determines at step 232 that a device 130 is not connected to port 126, telephone 110 ends the call in a conventional manner, at step 238.

Of course, various changes and modifications to the illustrative embodiment described above will be apparent to those skilled in the art. Such changes and modifications can be made without departing from the spirit and the scope of the invention and without diminishing its attendant advantages. It is therefore intended that such changes and modifications be covered by the following claims except insofar as limited by the prior art.

What is claimed is:

1. An apparatus comprising:
   a telephone;
   a port on the telephone for disconnectably connecting an external source of information to the telephone, wherein the external source comprises a media device configured to present media to one or more users; and
   on-hold functionality in the telephone operative while a call of the telephone is on hold, for presenting to a user of the telephone the information from the external source if the external source is connected to the port, and presenting to the user information transmitted to the telephone from a source other than the external source if no external source is connected to the port.

2. The apparatus of claim 1 wherein:
   the on-hold functionality is adapted to present to the user information received from a telephone network if no external source is connected to the port.

3. The apparatus of claim 1 wherein:
   the on-hold functionality is further adapted to present no information to the user, at the user's option and irrespective of whether the external source is or is not connected to the port.

4. The apparatus of claim 2 further comprising:
   a second port on the telephone for signaling to a telephone network whether or not to send information to the telephone while the call is on hold.

5. A method comprising:
   in response to an external source of information being disconnectably connected to a port of a telephone, wherein the external source comprises a media device configured to present media to one or more users, the telephone presenting the information from the external source to a user of the telephone while a call of the telephone is on hold; and
   in response to no external source of information being connected to the port, the telephone presenting information transmitted to the telephone from a source other than the external source to the user of the telephone while the call is on hold.

6. The method of claim 5 wherein:
   presenting information from a source other than the external source comprises presenting information received from a telephone network.

7. The method of claim 5 further comprising:
in response to a selection by the user, presenting no information to the user while the call is on hold, irrespective of whether the external source is or is not connected to the port.

8. The method of claim 6 wherein:
presenting the information from the external source comprises
  signaling the telephone network not to send information to the telephone while the call is on hold; and
presenting information received from a telephone network comprises
  signaling the telephone network to send information to the telephone while the call is on hold.

9. The method of claim 6 wherein:
presenting the information from the external source comprises
  signaling a telephone network not to send information to the telephone while the call is on hold;
presenting information from a source other than the external source comprises
  signaling the telephone network to send information to the telephone while the call is on hold; and
presenting no information to the user comprises
  signaling the telephone network not to send information to the telephone while the call is on hold.

10. The method of claim 9 wherein:
signaling the telephone network to send information comprises
  sending a SIP "200 OK" message with an "a=recvonly" indication; and
signaling the telephone network not to send information comprises
  sending the SIP "200 OK" message with an "a=inactive" indication.

11. The apparatus of claim 2 further comprising:
a communication interface on the telephone for communicating with the telephone network, wherein the communication interface is separate from the port.

12. The method of claim 6 wherein:
presenting information from a source other than the external source further comprises receiving the information from the telephone network at a communication interface of the telephone, wherein the communication interface is separate from the port.

13. A method comprising:
placing on hold a call which is connected between a telephone network and a first port on a telephone;
in response to an external source of first information being disconnectably connected to a second port of the telephone, the telephone presenting the first information to a user of the telephone while the call is on hold, wherein the external source comprises a media device configured to present media to one or more users; and
in response to the external source not being connected to the second port, the telephone presenting second information transmitted to the telephone from a source other than the external source to the user of the telephone while the call is on hold.

14. The method of claim 13 further comprising:
receiving the second information from the telephone network.

15. The method of claim 13 further comprising:
in response to a selection by the user, presenting no information to the user while the call is on hold, irrespective of whether the external source is or is not connected to the second port.

16. The method of claim 14 wherein:
presenting the first information comprises
  signaling the telephone network not to send the second information to the telephone; and
presenting the second information comprises
  signaling the telephone network to send the second information to the telephone.

17. The method of claim 15 further comprising:
receiving the second information from the telephone network and wherein:
presenting the first information comprises
  signaling the telephone network not to send the second information to the telephone;
presenting the second information comprises
  signaling the telephone network to send the second information to the telephone; and
presenting no information to the user comprises
  signaling the telephone network not to send the second information to the telephone.

18. The method of claim 17 wherein:
signaling the telephone network to send the second information comprises
  sending a SIP "200 OK" message with an "a=recvonly" indication; and
signaling the telephone network not to send the second information comprises
  sending the SIP "200 OK" message with an "a=inactive" indication.

19. The apparatus of claim 1, wherein the port comprises a Universal Serial Bus port.

20. The method of claim 5, wherein the port comprises a Universal Serial Bus port.

* * * * *